April 5, 1949.  L. E. ENDSLEY  2,466,087

FRICTION SPRING FOR RAILWAY CARS

Filed Oct. 15, 1946  2 Sheets-Sheet 1

INVENTOR.
LOUIS E. ENDSLEY.
BY Archworth Martin
his ATTORNEY.

April 5, 1949. L. E. ENDSLEY 2,466,087
FRICTION SPRING FOR RAILWAY CARS
Filed Oct. 15, 1946 2 Sheets-Sheet 2

INVENTOR.
LOUIS E. ENDSLEY.
BY Archworth Martin
his ATTORNEY.

Patented Apr. 5, 1949

2,466,087

UNITED STATES PATENT OFFICE 2,466,087

FRICTION SPRING FOR RAILWAY CARS

Louis E. Endsley, Pittsburgh, Pa., assignor to The Frost Railway Supply Co., Detroit, Mich., a corporation of Michigan Application October 15, 1946, Serial No. 703,413

2 Claims. (Cl. 267—9)

My invention relates to friction springs of the coil type such as those used in conjunction with other coil springs, between the truck bolsters and the truck frames of railway cars, to serve as snubbing devices, and comprises an improvement on the structure of application Serial No. 656,718, filed March 23, 1946, by Harry W. Frost, Jr., and assigned to Frost Railway Supply Company.

Friction springs of this type frequently comprise an inner, load-carrying coil and an outer coil or coils whose convolutions have frictional engagement with the convolutions of the inner coil, so that the convolutions of the outer coil will serve as snubbing elements during compression and expansion of the inner coil.

In springs of this type, it has been common practice to forge the end turns of the inner coil to tapered form, so as to provide an approximately flat seating surface, and also to form stop shoulders on such tapered sections, in position to be engaged by the extremities of the friction coils, to thus prevent too great creeping of the outer coils and to cause such turns or convolutions of these coils to be snapped back to their normal positions upon release of load from the inner coil. However, this arrangement reduces the strength of the inner coil, in its end turns.

My invention has for one of its objects the provision of a friction spring structure of such form that the inner coil requires no tapering of its end turns, for good seating engagement with the spring seats or caps, and which end turns have interlocking engagement with the spring seats to prevent rotative movement thereof relative to the inner coil, through thrust forces imposed by the outer or friction coil extremities upon stop shoulders that are formed on the spring seats.

Another object of my invention is to provide a friction spring structure that has various functional advantages over various prior art springs, and is nevertheless of simpler form, cheaper to manufacture and of lighter weight.

Figure 2:
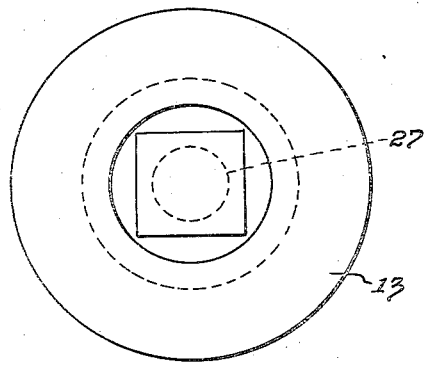
Figure 3:
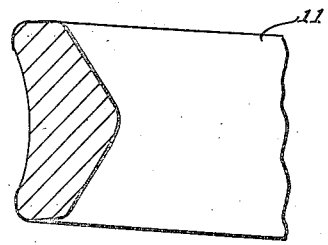
Figure 1:
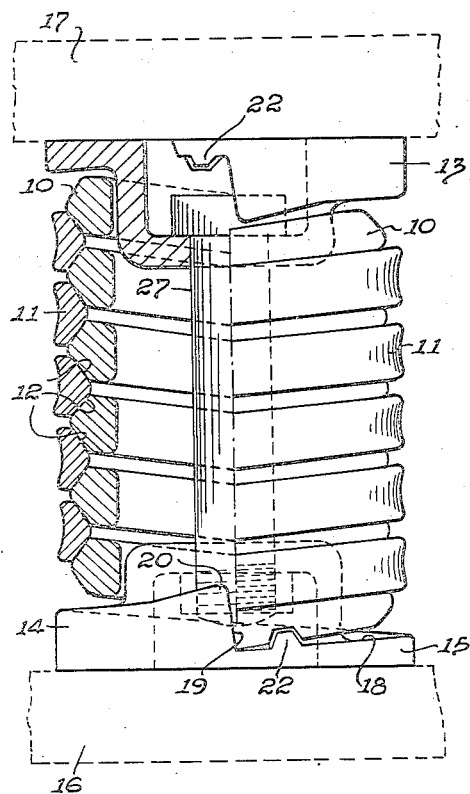
Figure 4:
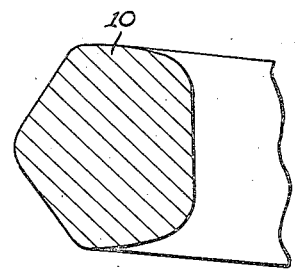
Figure 5:
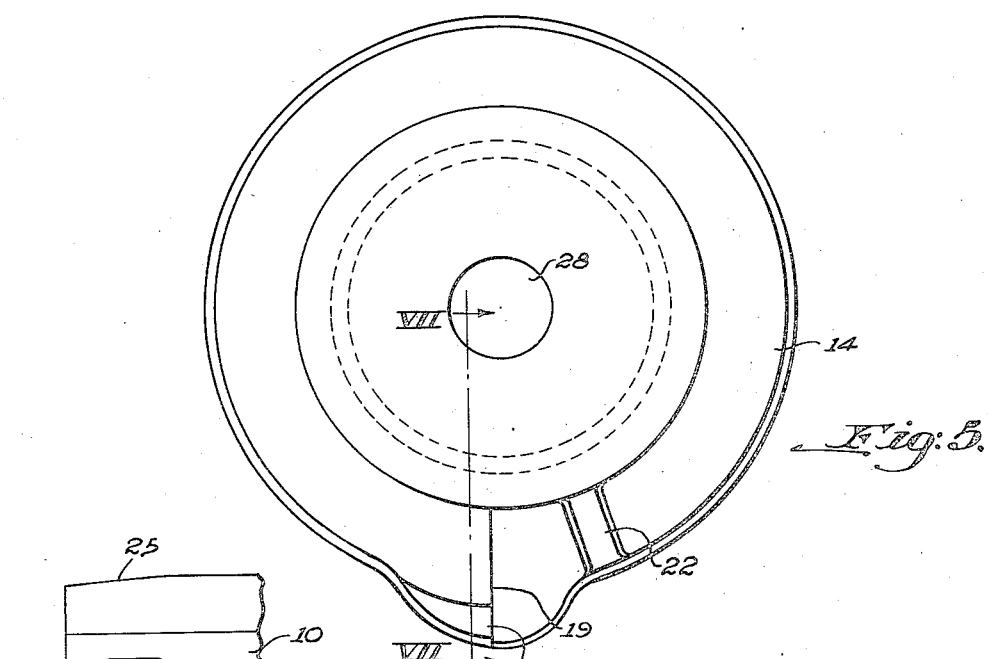
Figure 8:
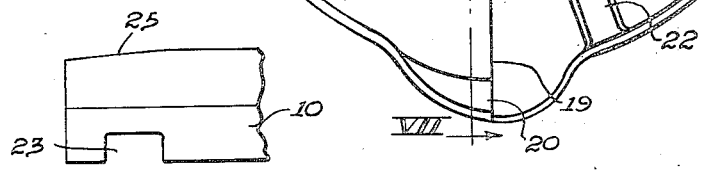
Figure 6:
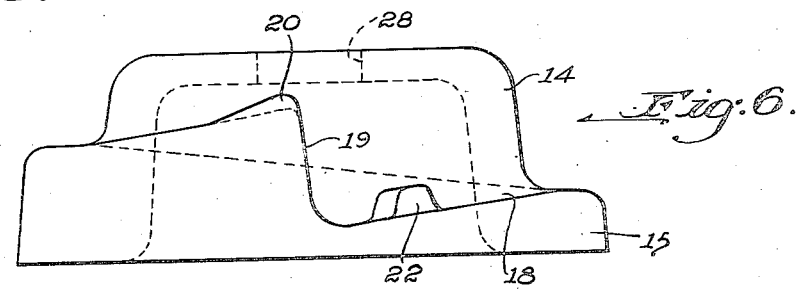
Figure 7:
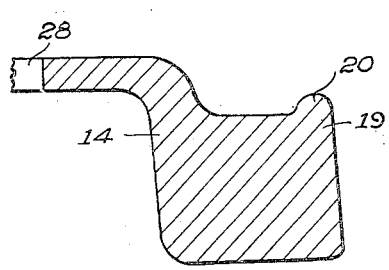
Figure 9:
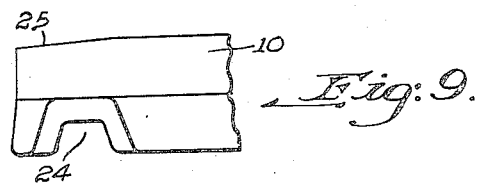

Figure 1 is a view partly in elevation and partly in section, showing a friction spring embodying my invention; Fig. 2 is an end view thereof; Fig. 3 is an enlarged cross sectional view of the outer coil of Fig. 1; Fig. 4 is a sectional view of the inner coil; Fig. 5 is an enlarged plan view of one of the spring seats of Fig. 1; Fig. 6 is a side view thereof; Fig. 7 is a sectional view taken on the line VII—VII of Fig. 5; Fig. 8 is an enlarged side view of a portion of an end turn or convolution of the inner coil of Fig. 1, and Fig. 9 shows a modification thereof.

Only so much of a spring structure is shown herein as is necessary to an understanding of my invention, it being understood that the coil structure shown in the drawing will usually be employed in conjunction with other coils at each truck frame, as is common practice. The inner, load-carrying coil is shown at 10 and is preferably formed of bar stock, that is of approximately uniform cross-sectional area throughout its length, and there is preferably uniform distances between its convolutions and hence there will be uniformity of stresses. The outer coil 11 will usually be made in two or more sections each of which has one and one-half or more convolutions and has angular friction surfaces cooperating at 12 with the friction surfaces on the inner coil.

Spring seats 13 and 14 are provided for the ends of the coil 10. These seats are of identical form and a description of one will suffice for both. The seats have annular flanges, such as the flange 15 on the seat 14, that respectively engage with a truck frame member at 16 and a bolster at 17. The flange 15 has an inclined or spiral surface 18 upon which the endmost convolution of the coil 10 will be fully seated when the coil is fully compressed under load. The uppermost convolution will engage the seat 13 in like manner.

A stop shoulder 19 extends from the low point to a high point of the surface 18 and, in addition, there is a protuberance 20 that constitutes an extension of the shoulder 19. The extremity of the coil 10 may abut the shoulder 19, and the coil 11 also engages the shoulder and the protuberance 20, when it tends to creep. The protuberance 20 reduces danger of the end of the coil 11 "jumping" past the stop shoulder.

Each of the seats 13—14 has a boss or lug 22 formed thereon, for engagement with a recess in the adjacent endmost convolution of the load-carrying coil 10. In Fig. 8, this recess is formed by slightly cutting out the coil 10, at 23, while in Fig. 9, this recess is formed by a forging operation, at 24. Also, I find it advantageous to bevel the end portions of the inner coil on one edge, adjacent to their extremities, as shown somewhat exaggeratedly at 25, in Figs. 8 and 9. This relief may be produced either by forging or grinding, and prevents the adjacent corner of the coil extremity from gouging and wearing the next preceding convolution when the spring is being compressed "solid." With a spring bar that is .90 inch thick in the direction of the axis of the coil, this relief need be no more than $\tfrac{3}{32}$ inch.

Also the boss 22 may suitably have a height of 7/32 inch and a vertically-tapered thickness of 5/16 inch to ¼ inch. The notch 23 would then suitably have a depth of ¼ inch and a width of 7/16 inch.

The coils 10 and 11 are held in assembled relation with the spring seats 13—14 by a bolt 27 that extends through circular holes 28 in the seats. The bolts and the holes can both be round, because there is no necessity for utilizing the bolt to hold the spring seats against rotative movements under thrusts of the friction coil 11. The structure can be more cheaply and simply made and be of lighter weight, than if provision had to be be made for interlocking the spring seats and bolt against relative rotative movements, as by making the holes square and using bolts that are square in cross section.

It will be seen that by interlocking the end turns of the load-carrying coil 10 with the lugs 22 on the spring seats, the seats are held against displacement relative to the coil, under load thrusts, and upon release of the load, the spring seats will be firmly held against thrust of the coil 11, so that such coil will be forced to return to its normal position with respect to the coil 10.

It will thus be seen that while the outer coil sections may tend to creep when there is inaccuracy in the manufacture of the coils, as explained in my Patent 2,389,300, it is desirable to have the two end sections of a three-section friction coil creep toward the stops. The interlocking connections here shown keep the outer coil from turning the caps 13—14, which turning would allow the outer end convolutions of the friction coils to shift out of engagement with the endmost convolutions of the inner coil.

I claim as my invention:

1. Friction spring structure comprising a load-carrying inner coil, a friction coil whose convolutions have frictional engagement with the convolutions of the other coil, a seating element for each end of the combined coil structure, stop shoulders on said elements in position to be engaged by the extremities of the rods that form the coils, and interlocking connections between the endmost convolutions of the load-carrying coil and the said seating elements, for preventing rotative movements of each seating element relative to its associated coil turn, the end turns of the load-carrying coil holding the end turns of the friction coil clear of the said seating elements at all points except at the said stop shoulders.

2. Friction spring structure comprising a load-carrying inner coil, a friction coil whose convolutions have frictional engagement with the convolutions of the other coil, a seating element for each end of the combined coil structure, stop shoulders on said elements in position to be engaged by the extremities of the rods that form the coils, and interlocking connections between the endmost convolutions of the load-carrying coil and the said seating elements, for preventing rotative movements of each seating element relative to its associated coil turn, the said interlocking connections each comprising a boss on one of these members fitting into a recess in the other member, the end turns of the load-carrying coil holding the end turns of the friction coil clear of the said seating elements at all points except at the said stop shoulders.

LOUIS E. ENDSLEY.

REFERENCES CITED

The following references are of record in the file of this patent:

UNITED STATES PATENTS

| Number | Name | Date |
|---|---|---|
| 1,170,146 | Gallagher | Feb. 1, 1916 |
| 1,183,837 | Brooks | May 16, 1916 |
| 1,860,122 | Wikander | May 24, 1932 |
| 1,989,433 | Symington | Jan. 29, 1935 |
| 2,095,545 | Endsley | Oct. 12, 1937 |

FOREIGN PATENTS

| Number | Country | Date |
|---|---|---|
| 451,480 | Germany | Oct. 27, 1927 |